Sept. 30, 1952     R. A. JOHNSON     2,612,325
FISHING REEL
Filed April 16, 1948     2 SHEETS—SHEET 1
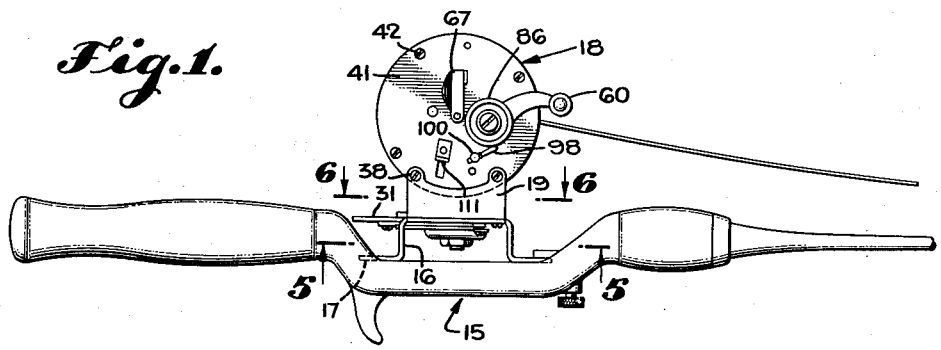
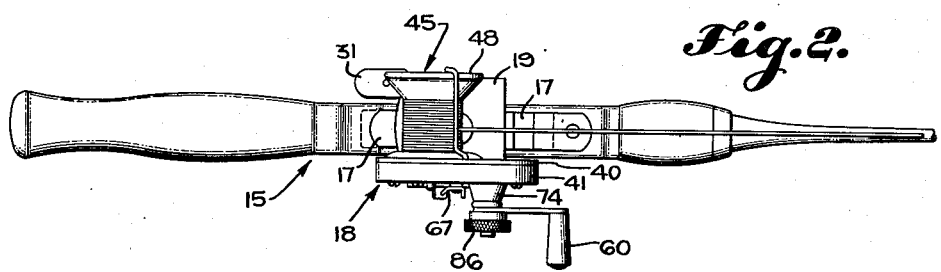
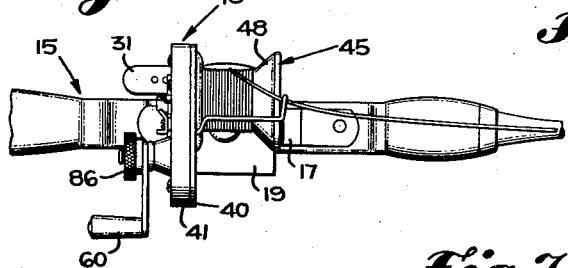
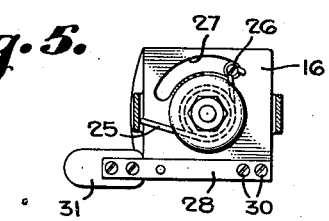
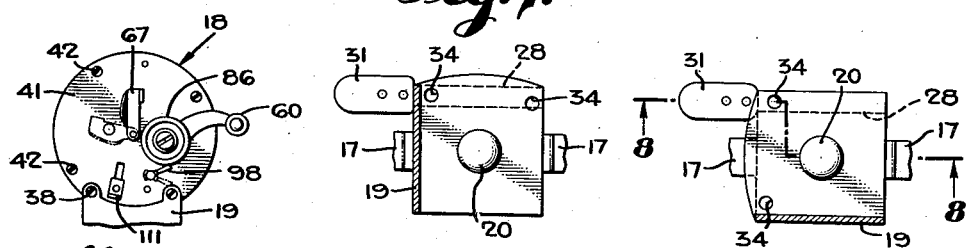
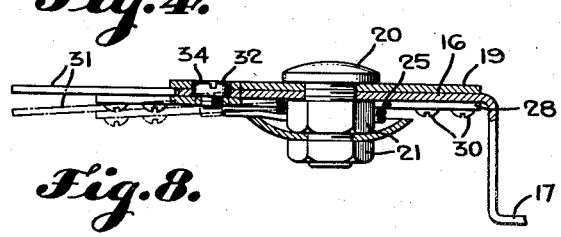
INVENTOR,
Rolly A. Johnson
BY
Hazard & Miller
ATTORNEYS.

Sept. 30, 1952    R. A. JOHNSON    2,612,325
FISHING REEL
Filed April 16, 1948    2 SHEETS—SHEET 2

INVENTOR,
Rolly A. Johnson
BY
Hazard & Miller
ATTORNEYS.

Patented Sept. 30, 1952

2,612,325

UNITED STATES PATENT OFFICE 2,612,325

FISHING REEL

Rolly A. Johnson, Los Angeles, Calif.

Application April 16, 1948, Serial No. 21,466

3 Claims. (Cl. 242—84.7)

1

This invention relates to fishing reels.

A main object of the present invention is to provide new and useful improvements in fishing reels, and particularly in a fishing reel of the type adapted to have the spool shifted relative to the rod from a position wherein the axis of the spool is longitudinal of the rod to a position wherein the axis of the spool is transverse of the rod.

Another main object of the present invention is to provide a slither or flicker arm operable to allow or prevent line on the spool from slithering or spinning off one end of the spool.

Another main object of the present invention is to provide in a reel an improved drive for the spool which drive can be operated to completely free the spool from the other parts of the reel for completely free rotation and which drive when in driving connection allows the spool to be rotated in click fashion in one direction even though the drive means is locked or braked.

With the foregoing and other objects in view, which will be made manifest in the following detailed description and specifically pointed out in the appended claims, reference is had to the accompanying drawings for an illustrative embodiment of the invention, wherein:

Fig. 1 discloses a side elevation view of a reel embodying the present invention mounted on a rod of conventional structure;

Fig. 2 shows a plan view of the apparatus disclosed in Fig. 1;

Fig. 3 discloses a plan view of a rod and reel with the spool of the reel swung to the position where its axis is longitudinal of the rod;

Figure 4 is a view of part of Fig. 1 showing the various controls for the reel with the controls in different positions than depicted in Fig. 1;

Fig. 5 discloses a sectional view along lines 5—5 of Fig. 1;

Fig. 6 discloses a sectional view along lines 6—6 of Fig. 1;

Fig. 7 discloses a view similar to that shown in Fig. 6 with the parts in a different position;

Fig. 8 is an enlarged sectional view along lines 8—8 of Fig. 6 showing the means for pivoting the reel frame and showing parts thereof in dot-dash lines in operative position;

2

Figure 9:
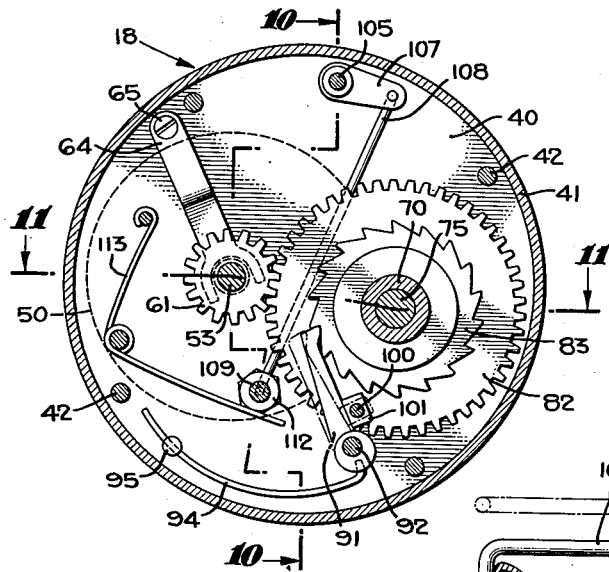
Fig. 9 is a sectional view of the reel.

Referring to the accompanying drawings wherein similar reference characters designate similar parts throughout, the reel of the present invention is mounted on a rod generally entitled 15, said reel having a base 16 which may be of any suitable construction, a preferred form being of channel shape and in having flanges 17 which fit within slots on rod 15 in the conventional manner.

A reel frame generally entitled 18 is mounted on base 16 by a lower angle member 19 of the frame which is pivoted to base 16 by means of a pivot screw 20, see Fig. 8, which has two jam nuts 21 threaded thereon and a dish-shaped member positioned between the nuts. A torsion spring 25 is positioned with the coils thereof encircling the inner nut and has one end fastened by any suitable means to base 16 and the other end thereof bent to fit around a protruding member 26 which is fastened to angle member 19 and slides within a curved slot 27 provided in base 16, as can be seen by reference to Fig. 5. A trip lever 28 of resilient construction is fastened at one of its ends by means of screws 30 to the underside of base 16 and has a finger engaging portion 31 on the other end thereof and is provided with a detent 32 securely fastened thereto and the angle member is provided with two locking apertures 34 into which the detent may snap. The torsion spring is preferably so arranged that when the spool is arranged traversely of the shaft, as shown in Fig. 5, that the torsion spring urges the protruding member against the portion of the base 16 bounding the right hand end of slot 27 and the slot is of such length as to prevent the reel frame from being swung more than slightly over 90° so that the detent 32 is automatically guided into the locking apertures 34. The trip lever 28 may be depressed so that the detent 32 is snapped out of one of the locking apertures 34 and the reel frame is pivoted or swung approximately 90° to the position shown in Fig. 3, the torsion spring is put under stress and under these conditions the detent is snapped into the other locking apertures 34 to prevent the torsion spring from returning the frame and spool to its traverse position, that is, the position where the spool has its axis traverse to the axis of the rod. However, when desired, the trip lever 28 may be tripped whereby the torsion spring 25 snaps the frame and spool back to the traverse position.

Figure 10:
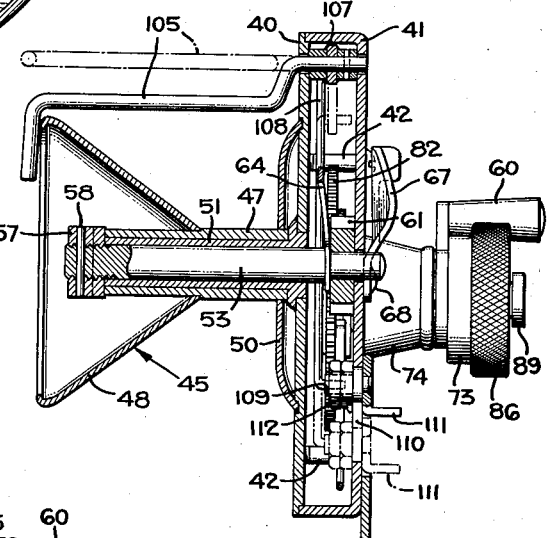
Fig. 10 is a sectional view along lines 10—10 of Fig. 9.

Angle member 19 has the upper part of the frame mounted thereon by screws 38, the upper part of the frame comprising a disc shaped member 40 and a cup shaped member 41 which are suitably fastened together by means of fastening screws 42, see Figs. 9 and 10.

Figure 12:
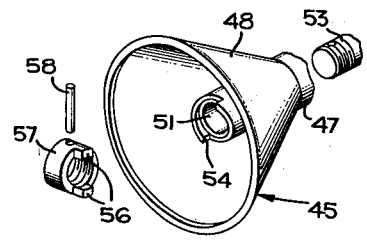
Fig. 12 is a perspective view showing the spool with parts thereof separated to show the manner of construction.

A spool generally entitled 45 is provided on the reel and comprises a cylinder hub 47 which has a cone shaped member 48 fastened thereto such as by soldering, brazing, welding, etc. A dish shaped member 50 is fastened near the other end of hub 47 and the outer peripheral edges of the dish member 50 ride within a circular groove provided in the outer face of the disc member 40. Spool 45 is rotatably supported on a hollow axle 51 which is rigidly supported at one end from disc member 40. Spool 45 has a driving connection to a floating spindle 53 which spindle is rotatably mounted in hollow axle 51. The driving connection preferably takes the form of a ratchet drive which may be provided by forming teeth 54 on the end of hub 47 as shown in Fig. 12 which teeth have a one-direction drive with lugs 56 provided on a threaded collar 57, which collar is threaded on and pinned at 58 to spindle 53.

Spool 45 is driven by means of a crank 60 through a friction drive and a gear system including a gear 61 which is fixedly mounted on spindle 53 by any suitable means.

The ratchet drive for the spool is so constructed that there is a positive drive when crank 60 is rotated to reel in the line but is so constructed that if the crank is reversed and the spool held that the ratchet drive will allow the crank to be rotated, the lugs on the collar 57 riding over the back of teeth 54 with the floating spindle 53 reciprocating back and forth. If there is tension on the line tending to pull the line from the spool the lugs are so arranged as to engage the front of the teeth so that hub 47 of the spool is locked through the floating spindle 53.

Figure 11:
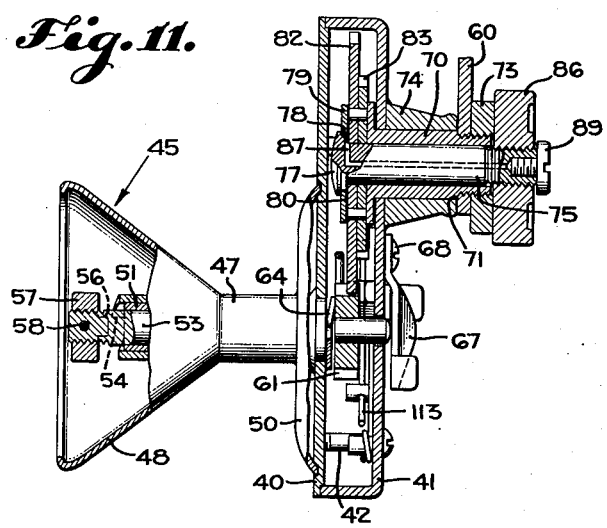
Fig. 11 is a sectional view along lines 11—11 of Fig. 9.

Floating spindle 53 is urged to move to the right as the spindle is depicted in Fig. 10 by means of a leaf spring 64 which is fastened to disc 40 at one end by means of a screw 65, the other end being forked and fitting around the floating spindle between the driven gear 61 and disc 40, as best seen in Figs. 9 and 11. Means are provided to depress the floating spindle to positively disengage the spindle from spool 45 and this means preferably comprises a cam lever 67 pivoted at 68 to cup member 41 and which cam lever is so constructed that when moved from the position shown in Fig. 1 to the position shown in Fig. 4, floating spindle 53 is moved from the position shown in Fig. 10 to the position shown in Fig. 11 to positively disengage the spool 45 from the spindle 53. When cam lever 67 is moved, it moves the spindle against the resistance of leaf spring 64 so that whenever the cam lever is in the position shown in Fig. 1 the spindle and spool will always be in a driving connection.

Now referring to crank 60 and the friction drive previously mentioned, crank 60 is threaded on a hollow flanged driving shaft 70 up against a shoulder 71 and locked against the shoulder by means of a jam collar 73 which is threaded up against crank 60. Hollow shaft 70 is rotatably mounted within a boss 74 which is fastened to the outer face of cup member 41. A slippage shaft 75 is rotatably mounted within hollow shaft 70 and has a head 77 and a squared portion 78 on its inner end, the squared portion locking within a square hole in a washer 79, and a felt washer 80 is positioned next the washer 79. A gear unit comprising a driving gear 82 which meshes with driven gear 61 and a ratchet wheel 83 which are pinned together is rotatably mounted on slippage shaft 75 and positioned between felt washer 80 and the flange on hollow driving shaft 70, as shown in Fig. 11. Means for squeezing the gear unit between the felt washer and the flange are provided and comprise a knurled nut 86 which is threaded on slippage shaft 75. By screwing knurled nut 86 up against jam collar 73, the gear unit is squeezed between the felt washer 80 and the flange on hollow driving shaft 70; therefore, a friction drive is established between the driving shaft 70 and driving gear 82. The frictional force can be varied by adjustment of knurled nut 86. An oil passage 87 is provided in slippage shaft 75 and leads to felt washer 80. A screw 89 closes passage 87 at the outer end of slippage shaft 75 and serves to keep the knurled nut on shaft 75. The various parts above described are so constructed and arranged that the friction of force between knurled nut 86 and jam collar 73 is greater than the combined frictional force between the felt washer 80 and the driving gear 82, and between the flange on hollow shaft 70 and ratchet wheel 83, so that slipping takes place between the latter named surfaces.

A ratchet 91 is pivoted at 92 to cup member 41 and engages ratchet wheel 83, as shown in full lines in Fig. 9. A curved spring 94 has one end slidably mounted in a pin 95 which pin is fastened to cup member 41 and the other end of curved spring 94 is fastened to the ratchet 91, as shown in Fig. 9. Curved spring 94 urges ratchet 91 into engagement with the ratchet wheel 83. A ratchet lever 98 is fastened on the outer end of a pin 100 so that the ratchet may be flipped into and out of engagement with ratchet wheel 83 and this is accomplished by providing a rectangular block 101 on the inner end of pin 100 so that when the lever 98 is flipped to one position block 101 pushes the ratchet away from the ratchet wheel, as shown in dot-dash lines in Fig. 9 and when moved to its other position, as shown in full lines in Fig. 9, the curved spring will push the ratchet into engagement with the ratchet wheel.

A slither arm 105 is pivoted preferably by one end between the cup member 41 and disc 40 of the reel frame and is bent downwardly, as shown in Fig. 10, outwardly and downwardly again to lap over the outer edges of the cone 48 on spool 45, the marginal edges of spool 48 being curved inwardly, as shown in Fig. 10. This slither arm may be swung from the full line position in Fig. 10 to the dot-dash line position shown in Fig. 10 where it is in inoperative position, permitting line on the spool to be whirled over the end of the spool in slither fashion. Means for pivoting arm 105 are provided and preferably comprise a crank 107, see Fig. 9, which is fastened at one of its ends to arm 105 and pivoted to a connecting rod 108, said connecting rod having its other end pivoted to a stud shaft 109, which stud shaft passes through a slot 110 provided in cup member 41 and has a depressing lug 111 fastened thereon. Two jam nuts 112 are threaded on stud shaft 109 so that there is proper clearance between the depressing lug 111 and cup member 41. A torsion spring 113 is looped at its middle around a bridging screw 42 and has one end thereof bent to fit around a second bridging screw 42, as shown in Fig. 9, and the other end thereof bears against the jam nuts 112 urging lug 110 in its uppermost position. When the depressing lug 111 is depressed, the torsion spring 113 is deformed and the slither arm raised from the full line position shown in Fig. 10 to the dot-dash line position and casting may take place with the line whirling over the end of the spool and when pressure on the depressing lug is released the torsion spring 113 snaps the slither arm back down over the spool so that in order for the line to whirl off the spool it must raise the slither arm against the tension of the torsion spring this resulting in a brake as is desired.

Among the many uses to which the reel lends itself only a few main examples will be given to illustrate its usefulness and novelty. Assume that it is desired to perform a casting operation. The first thing required is that the correct amount of line be let out from the spool so that the fisherman has that length of line which he has found by experience that he can best throw. Normally with the ordinary reel, assuming that the line is wound around the spool so that the lure or spinner is fairly close to the end of the rod, the ratchet engaging the ratchet wheel must be moved out of engagement and the crank rotated in reverse fashion and when the line gets somewhere near the correct length, care is usually taken to see that the crank is moved away from the fisherman so that it will not interfere with operation of any of the controls on the reel. If the fisherman attempts to get a closer approach to the length of line which he desires he is unable to do so unless he positions the crank more toward him, that is, over the face of the reel which is undesirable.

In the present invention, adjustment of the length of line for casting purposes may be made in two ways: One way comprises pivoting the cam lever 67 so as to press the floating spindle to disengage the floating spindle from the spool 45 whereby the fisherman may grasp the line and merely pull it out to the exact length which is desired. Under these circumstances, crank 60 may be first positioned in the place in which it will least interfere with the fishing operation, and then the line pulled out to the exact length desired. The second manner consists in swinging the ratchet lever 98 so as to disengage the ratchet from the ratchet wheel and then merely grasp the line and pull it off the spool, this operation pulling out the line and rotating the crank 60 in the reverse direction from which reeling in is accomplished. Line is drawn out until there is slightly more than desired, the crank being moved to a position whereby it does not cover the face of the reel and held in the remote position and the spool manually grasped and rotated so as to wind the line about the spool. During this manual rotation of the spool, the lugs 56 will ride over the backs of the teeth 54 thereby reciprocating the floating spindle 53 and this operation continued until the proper length of line is obtained. The operation of reversing the spool with the crank 60 remaining stationary finds many uses for adjustment purposes when fishing.

When it is desired to cast, the trip lever 28 is depressed and the reel frame swung approximately 90° so that spool 45 has its axis along the rod. The casting operation is performed in the usual manner with the exception that as the rod is brought forward the depressing lug 111 is depressed so that the slither arm 105 is swung clear of spool 45 permitting the line thereon to whirl over the coned end of the spool in slither fashion with the spool remaining substantially stationary. Therefore, with the line whirling over the spool in slither fashion there is no possibility of backlash. If the fisherman sees that the spinner or lure is going too far he can merely release the depressing lug 111 whereby the torsion spring 113 snaps the slither arm down on the spool so that the line must lift the slither arm against the resistance of torsion spring 113 each time it whirls around the spool which action serves to effectively put a brake on the line and control the overcast. It is to be noted that the natural tendency in casting overhead is to press down on the rod and by providing a depressing lug which is depressed instead of raised during the casting operation, the reel is easy to use and requires little training because the reel is designed to accommodate the natural reflexes during casting.

The reel of the present invention has particular utility when it is desired to surface cast. In such case, the casting operation takes place as before described except that when the fisherman sees the lure or weight strike the surface of the water he will trip the trip lever 28 so that torsion spring 25 snaps the reel frame back so that the spool is traverse to the axis of the rod whereby the fisherman may immediately begin reeling in thereby keeping the lure or spinner near the surface of the water and in case a fish strikes the bait the tension on the line will be taken by the spool.

The pivoting of the floating spindle 53 serves many purposes but finds particular utility when fishing off a pier or like place where the fisherman is required to undercast. In this case, judgment of the length of line to be thrown is made by comparing the distance of the line from the water and the length of line may be increased very simply by merely pivoting cam lever 67 to disengage spool 45 from floating spindle 53 letting the weight of the line and lure or spinner pull the line down to the correct length. It will be seen then that the line lengthens to the desired amount and undercasting can be easily accomplished with maximum results.

The reel of the present invention also finds particular utility when fishing off a moving boat as, for instance, when it is desired to let the bait or lure or spinner remain in a particular spot for awhile with the boat moving on. For instance, in swordfishing where the swordfish first hits or strikes the bait and then circles and comes back to swallow the bait, it is desirable that some means be provided whereby the bait can be left temporarily in the spot where the swordfish first strikes it. With the reel of the present invention this may be easily accomplished by letting the line drag back of the boat with the ratchet in place and keeping the thumb in the proximity of the cam lever 67 and when a swordfish strikes the bait the lever is flipped to depress the floating spindle to disengage the spool whereby the spool is perfectly free and the line reels outwardly allowing the bait to stay approximately in the position where it was first struck until the swordfish circles and returns.

In other instances a fisherman may desire to drag the spool or line by thumbing the spool as in present practice and in cases where great distance is not desired. This may be very easily accomplished with the present invention by pivoting the cam lever 67, disengaging the spool 45 from the floating spindle 53 so that the spool is freely rotatable, then making the casting operation and keeping the thumb on the spool. Since the spool is freely rotatable and is not geared to any gears or other parts, a greater distance in casting is allowed by a thumb operation than in prior devices where the inertia of the moving parts entered into the operation. Also, since the inertia of the other parts of the spool are eliminated, there is less chance for backlash than in the ordinary manner of casting.

So it will be seen, that the present invention provides a universal reel which can be used for all kinds of fishing including light casting such as bass casting, lake fishing, pier, surf or boat fishing.

Various changes may be made in the details of construction without departing from the spirit and scope of the invention as defined by the appended claims.

I claim:

1. In a fishing reel, a gear housing, a shaft having one end extending into the gear housing, a pinion on the shaft in the housing, a gear meshing with the pinion, means for rotating the gear to drive the pinion and thus rotate the shaft, the shaft being axially slidable relative to the housing between limits which cause the gear and pinion to remain constantly in mesh, a sleeve secured to the housing and disposed about the portion of the shaft that projects from the gear housing, a spool rotatable on the sleeve, a clutch between the outer end of the spool and the outer end of the shaft, and means on the gear housing for axially shifting the shaft to cause the clutch to disengage and thus free the spool from the shaft.

2. In a fishing reel, a gear housing, a shaft having one end extending into the gear housing, a pinion on the shaft in the housing, a gear meshing with the pinion, means for rotating the gear to drive the pinion and thus rotate the shaft, the shaft being axially slidable relative to the housing between limits which cause the gear and pinion to remain constantly in mesh, a sleeve secured to the housing and disposed about the portion of the shaft that projects from the gear housing, a spool rotatable on the sleeve, a clutch between the outer end of the spool and the outer end of the shaft, spring means urging the shaft into an axial position wherein the clutch is engaged, and means on the gear housing for shifting the shaft axially against the urging of the spring means to disengage the clutch and thus free the spool from the shaft.

3. In a fishing reel, a base applicable to a fishing rod, a gear housing rotatably mounted thereon for rotation relatively thereto between limits, a sleeve projecting from one side of the housing, a shaft rotatable in the sleeve and extending into the housing, a spool rotatable on the sleeve, a clutch between the outer end of the shaft and the spool, a pinion on the shaft within the housing, the shaft being axially slidable within the sleeve between limits to engage and disengage the clutch, a gear within the housing constantly meshing with the pinion, a crank on the opposite side of the housing from the sleeve for rotating the gear and thus driving the pinion and shaft, a second crank on the same side of the housing as the mentioned crank, means operable by the second crank for axially shifting the shaft, a slither arm rotatably mounted on the housing normally overlying the spool and extending inwardly toward the axis of rotation of the spool over the outer end thereof, said slither arm being adapted upon rotation to completely disengage the spool to permit line on the spool to be axially unwound therefrom, means movably mounted on the same side of the housing as the cranks for rotating the slither arm, and spring means urging the slither arm into its normal position.

ROLLY A. JOHNSON.

REFERENCES CITED

The following references are of record in the file of this patent:

UNITED STATES PATENTS

| Number | Name | Date |
|---|---|---|
| 1,114,084 | Wells | Oct. 20, 1914 |
| 1,150,575 | Blodgett | Aug. 17, 1915 |
| 1,577,812 | Robinson et al. | Mar. 23, 1926 |
| 1,617,543 | Roberts | Feb. 15, 1927 |
| 2,120,190 | Rickards et al. | June 7, 1938 |
| 2,130,671 | Maynes | Sept. 20, 1938 |
| 2,352,138 | Torrence | June 20, 1944 |

FOREIGN PATENTS

| Number | Country | Date |
|---|---|---|
| 211,406 | Great Britain | Feb. 21 1924 |
| 383,423 | Great Britain | Nov. 17, 1932 |
| 828,000 | France | Mar. 6, 1938 |
| 49,548 | France | Mar. 1, 1939 |
| | (Addition to No. 828,000) | |
| 882,204 | France | Mar. 21, 1943 |